(12) United States Patent
Ren et al.

(10) Patent No.: US 6,277,290 B1
(45) Date of Patent: Aug. 21, 2001

(54) PROCESS FOR RECOVERING SILVER FROM PHOTOGRAPHIC SOLUTIONS

(75) Inventors: Jian Min Ren, Dollard des Ormeaux; John L. Riviere, Beaconsfield, both of (CA)

(73) Assignee: Metafix Inc. (CA)

( * ) Notice: Subject to any disclaimer, the term of this patent is extended or adjusted under 35 U.S.C. 154(b) by 0 days.

(21) Appl. No.: 09/465,716

(22) Filed: Dec. 17, 1999

(51) Int. Cl.$^7$ ........................................ C02F 1/70
(52) U.S. Cl. .................. 210/749; 210/757; 210/263; 210/912; 210/919
(58) Field of Search .................. 210/749, 757, 210/263, 663, 668, 669, 679, 688, 912, 919

(56) References Cited

U.S. PATENT DOCUMENTS

| | | |
|---|---|---|
| 4,008,077 | 2/1977 | Wallace . |
| 4,325,732 | 4/1982 | Woog . |
| 4,331,473 | 5/1982 | King, Jr. . |
| 4,662,613 | 5/1987 | Woog . |
| 4,842,644 | 6/1989 | Senff . |
| 4,881,973 | * 11/1989 | Williams . |
| 5,173,247 | 12/1992 | Woog . |
| 5,229,009 | * 7/1993 | Woog . |
| 5,288,728 | * 2/1994 | Spears et al. . |
| 5,296,111 | * 3/1994 | Suzuki et al. . |
| 5,401,005 | 3/1995 | Woog . |
| 5,900,041 | 5/1999 | Ren et al. . |

FOREIGN PATENT DOCUMENTS

| | | |
|---|---|---|
| 0 366 334 | 5/1990 | (EP) . |
| WO 89/05866 | 6/1989 | (WO) . |
| WO 95 00881 | 1/1995 | (WO) . |

OTHER PUBLICATIONS

Patent Abstracts of Japan, vol. 1999, No. 11, Sep. 30, 1999 & JP 11 152527 A (Japan Organo Co Ltd) Jun. 8, 1999.
Patent Abstracts of Japan, vol. 001, No. 136, Nov. 10, 1977 & JP 52 073033 A (Fuji Photo Film Co Ltd) Jun. 18, 1997.
XP–002146257, "Recovering silver from photographic fixing solution" (Fuji Photo Film Co Ltd) Jun. 18, 1977.
Knorre H et al, "Chemical Treatment of Effluent from Photofinishing Plants" Journal of Imaging Technology, US, Soc. for Imaging Science and Technology, Springfield, VA, vol. 14, No. 6, Dec. 1, 1988.
Silver Recovery—Kodak Chemical Recovery Cartridge, Model II.

* cited by examiner

Primary Examiner—David A. Simmons
Assistant Examiner—Betsey Morrison Hoey
(74) Attorney, Agent, or Firm—Bachman & LaPointe, P.C.

(57) ABSTRACT

Silver recovery from a silver-bearing spent photographic solution is achieved by reducing the silver ions to silver metal with an organic reducing agent, especially a photographic developer reagent; in particular a spent photographic developer solution provides a convenient source of reducing agent for the silver recovery; in this case the developer reagents which typically are phenol-type compounds are oxidized leading to a less toxic discharge effluent having a lower COD and BOD.

19 Claims, 1 Drawing Sheet

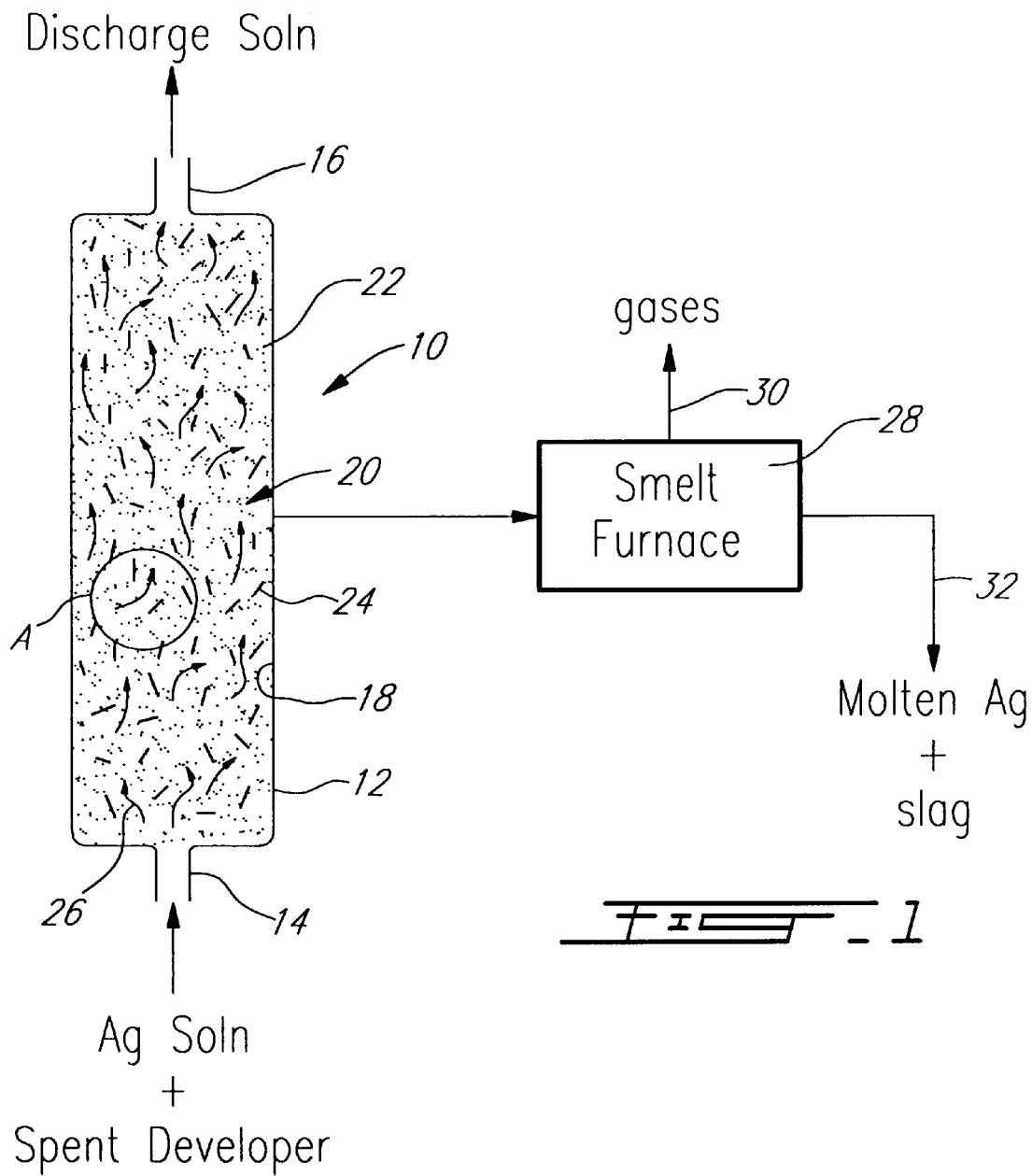
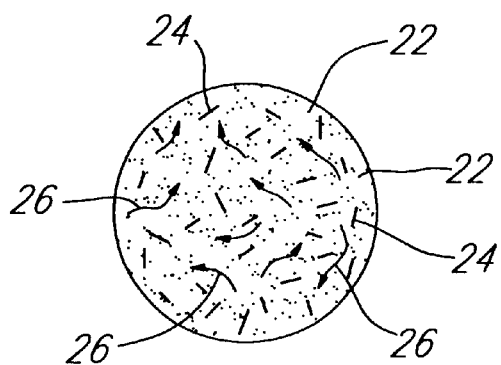

PROCESS FOR RECOVERING SILVER FROM PHOTOGRAPHIC SOLUTIONS

BACKGROUND OF THE INVENTION i) Field of the Invention

The invention relates to a process for recovering silver metal from an ionic silver-bearing spent photographic solution; and in an especially preferred embodiment exploits reduction of silver ions to silver metal with a photographic developer reagent as the reducing agent.

ii) Description of Prior Art

The commercial processing of photographic materials, industrial X-rays, medical X-rays and graphical arts produces spent solutions containing silver ions. Environmental regulations restrict the discharge of such solutions to within acceptable concentrations of silver that are much less than the concentrations of silver in the spent solutions. Various methods of removing silver from these solutions have been attempted, with varying expense and success.

The most common types of silver recovery in current use include the use of steel wool in a chemical replacement cartridge (CRC), electrolysis, ion exchange, and a precipitation method. Some CRCs are messy and the effluent therefrom can contain high concentrations of iron. Electrolysis is expensive, requires significant maintenance, and can result in ammonia gas generation. Ion exchange is costly and impractical for smaller photo processors and minilabs. Employment of sodium sulfide as a precipitating agent can result in the evolution of toxic fumes. Another approach has been use of a silver complexing agent to remove silver from photographic effluent solutions, however, complexing agents are often costly.

A problem with these approaches is that separate separation facilities and equipment are required, which can be inconvenient and expensive, particularly for small photoprocessing labs or minilabs. Furthermore, these processes do not provide a process capable of recovering silver from minilab effluent solutions such as photographic stabilizers to obtain a sufficiently low silver concentration acceptable for discharge to the environment.

U.S. Pat. Nos. 4,662,613 and 4,325,732 of Woog and U.S. Pat. No. 5,900,041 of Riviere and Ren describe recovery of silver by ion exchange between silver ions and iron metal. These processes result in an iron ion bearing discharge effluent from which the iron ions often precipitate as iron oxides.

U.S. Pat. No. 5,288,728 describes the use of a trimercapto-s-triazine complexing agent to precipitate silver in a silver complex. While the method lowers the silver concentration in the effluent, the cost of the complexing agent is significant, additionally it is a man made chemical with unknown long term effects on the environment.

No prior art is known that employs an organic reducing agent as the primary means of recovering silver from an ionic silver bearing spent photographic effluent.

SUMMARY OF THE INVENTION

It is an object of this invention to provide a process for recovering silver metal from an ionic silver bearing spent photographic solution.

It is a particular object of this invention to provide such a process in which silver ions are reduced to silver metal with spent photographic developer solution.

In accordance with the invention there is provided a process for recovering silver from an ionic silver bearing spent photographic solution comprising: reducing silver ions in said solution to silver metal with an organic reducing agent.

DESCRIPTION OF PREFERRED EMBODIMENTS a) Silver Rich Solution

The ionic silver-bearing spent photographic solution is referred to herein, for convenience, as a silver rich solution.

The silver rich solution may be, for example, a spent black and white photoprocessing fixer solution and which contains residual silver ions of the photographic film not employed in the development of the photographic image.

The silver rich solution may also be a spent colour photoprocessing solution.

The silver rich solution is any effluent solution or mixture of solutions, derived from photoprocessing and which contains silver ions in a recoverable amount.

Typically the silver rich solution will contain at least 10 ppm and generally at least 1000 ppm of silver ions, and the discharge solution after reduction of silver ions to silver metal will contain no more than 5 ppm of silver ions.

A completed photographic image is washed with water and the resultant wash water may contain silver ions, typically in an amount of 10 to 250 ppm. Such a wash water may be employed as a silver rich solution in accordance with the invention.

b) Organic Reducing Agent

The invention employs an organic reducing agent effective to reduce silver ions to silver metal. In the reduction reaction one silver ion receives one electron and is reduced to silver metal which exits or precipitates from the solution. At the same time, the organic reducing agent loses an electron and is thereby oxidized.

It is preferred to employ organic reducing agents which produce a harmless, non-toxic oxidation by-product.

The preferred organic reducing agent is a photographic developer reagent and for this purpose there is typically employed spent photographic developer solution. Spent photographic developer solution is developer solution which has been used in the photoprocessing procedure to develop a photographic image, and which contains residual developer reagent capable of reducing silver ions to silver metal. The solution is considered spent in that it is past optimum or satisfactory performance as a photoprocessing developer.

Typical developer reagents employed in photoprocessing developer solutions include pyrogallol, hydroquinone, catechol, p-phenylene diamine, paminophenol, methyl-p-aminophenol sulfate, amidol, pyramidal, and 4-(N-ethyl-N-2-methanesulfonylaminoethyl)-2-methylphenylenediamine sesquisulfate monohydrate; these developer reagents may be employed directly as the organic reducing agent, alone or in combination; or they may be employed as the residual developer reagent in spent developer solutions. In such case there will conveniently be spent developer solution generated at the site at which the silver rich solution is generated In this way a waste product, of the photoprocessing procedure, which itself presents a disposal problem is employed as the source of the organic reducing agent.

The developer reagents are typically phenol-type compounds, and disposal of spent developer solution containing residual phenol-type compounds is a potential problem. The present invention provides the side advantage that the residual phenol-type compounds are oxidized in the reduction of the silver ions, to non-phenolic compounds, so that the content of phenol-type compounds in the effluent is lowered resulting in a less toxic discharge effluent having a lower COD and BOD.

Other suitable organic reducing agents include sugars, glycol, glycerin, alcohols, especially lower alkanols of 1 to 6, preferably 1 to 4 carbon atoms and substituted benzenes wherein the substituent is one or more of OH; Br; I; $NR_2$, where R is hydrogen or lower alkyl of 1 to 6 carbon atoms; or SR where R is as defined hereinbefore; for example, phenol, bromobenzene, iodobenzene and aniline.

c) Process Conditions

The process parameters for the reducing reaction of the invention are described hereinafter with particular reference to the preferred embodiment in which a spent developer solution is the source of the organic reducing agent.

The reducing reaction may be carried out at a temperature of 0° C. to 100° C., preferably 15° C. to 100° C.

At lower temperatures the reducing reaction may be too slow to be practicable; higher temperatures lead to a faster reaction time and a more complete and efficient reduction of silver ions to silver metal.

The reducing reaction is suitably carried out at a pH in the range of 6 to 14. In general a pH of at least 7 is preferred and especially a pH of 7 to 9. At higher pH the developer reagents in spent developer solutions are more readily oxidized and thereby the silver ions are more readily reduced to silver metal. On the other hand, at pH above 9 ammonium acetate which is a common component of fixer solutions and is thus a likely component of the silver rich solution liberates ammonia which may be undesirable in the operating environment.

In general, the pH is adjusted to the desired range by adjusting the relative proportions of the silver rich solution which is acidic, and the spent developer solution which is alkaline; alternatively an alkaline agent such as sodium hydroxide solution could be added to increase the pH.

The reducing reaction is most preferably carried out in the presence of a catalyst. The preferred catalyst is iron, but other acceptable catalysts include aluminum, copper, nickel, platinum, palladium, aluminum oxide and zeolites.

The efficiency of the catalyst is found to increase as the surface area of the catalyst is increased, and the catalyst is largely unconsumed in the reducing reaction. This suggests that the silver ions and the organic reducing agent are brought into appropriate relative conformations on the surface of the catalyst, for the reduction reaction.

Highly efficient reduction of silver ions to silver metal has been achieved employing spent developer solution as the source of the organic reducing agent and particles of steel wool as the catalyst.

It is known that steel wool can be employed as an exchange metal for silver ions, with precipitation of silver metal and entry of iron ions into solution. It is found, however, that the reducing reaction of the invention proceeds with low formation of iron ions, which indicates that in the presence of the organic reducing agent, the reducing reaction of the invention proceeds in preference to the metal exchange reaction. The low formation of iron ions in the process of the invention employing steel wool, primarily as an iron catalyst, represents an advantage over the prior exchange process employing steel wool. In the metal exchange process the iron ions tend to precipitate from the discharge effluent as iron oxides which clog drains and conduits, requiring periodic cleaning operations This is avoided in the present invention.

On the other hand, the use of steel wool as the catalyst has the advantage that in circumstances where the content of the developer reagent in the spent developer solution is depleted such that the silver ion reduction efficiency falls, the metal exchange reaction may take place to offset the fall in efficiency of the catalyzed reduction reaction. In such case the content of iron ions in the discharge effluent will still be lower than that of a conventional full metal exchange reaction for silver recovery.

In maximizing the surface area of the catalyst it is expedient to employ the catalyst in a particulate form, in a bed, and to flow the silver rich solution and the spent developer solution together through the bed. The steel wool, or other catalyst, may be employed alone, but it is advantageous that the particles of the catalyst be spaced apart, so as to minimize contact between adjacent particles and thereby maximize the area of the catalyst particles exposed to the silver solution and the spent developer solution, for catalysing the reduction of silver ions to silver metal.

Conveniently the catalyst may comprise elongate particles of steel wool and the bed may be formed by co-mingling the particles of steel wool with a particulate inert substrate, for example, cellulosic fibers, synthetic fibers or particles of synthetic or natural sponge material.

Suitable cellulosic fibers include cellulosic paper fiber. Such fiber may be virgin paper fiber or may be recycled paper fiber derived from the recycling of paper products. Suitable synthetic fibers include polyethylene, polyester and polyamine, for example, nylon fibers.

Suitable sponge material includes synthetic compressible sponges, for example, polyurethane sponge, in a particle form in which the sponge is shredded or chopped into small portions while retaining the sponge structure which is characterized by a plurality of open pores or cells.

Typically the steel wool particles co-mingle and interlock with the particulate inert substrate so as to form a bed in which the steel wool particles are dispersed throughout a mass of the particulate inert substrate.

The particles of the inert substrate, which may be fibers are typically present in a random, non-aligned arrangement, rendering the mass porous or permeable to liquid flow, and in particular, providing random flow paths for flow of the solutions throughout the mass so as to maximize the contact between the solutions and the surface of the catalyst particles. In the case of sponge particles, as in the case of fibers, flow paths are formed between the particles of sponge and between the open cells in the sponge and the permeability of the mass of sponge particles can be adjusted by the relative ratio of the components and an appropriate level of compression.

The mass of the particulate inert substrate retains its integrity and does not collapse as the solutions flow through the bed; the mass of the particulate substrate thus serves to support the catalyst particles in a dispersed state which provides the desired maximization of the exposed surface area of the catalyst particles.

Suitable chopped steel wool particles have an average diameter of 0.01 to 0.2 mm, preferably 0.03 to 0.06 mm and an average length of 1 to 7 mm, preferably about 2 to 4 mm, however, it will be recognized that further reducing the particle size will beneficially increase the catalyst surface area.

In operation it is found that the silver metal precipitates and is deposited on the catalyst surface, whereby the available catalyst surface area is diminished. However, the silver also precipitates as free silver metal particles which are retained in the bed.

After separation the mixed discharge solution containing the oxidized organic reducing agent can be discharged directly into a sewer.

Silver retained in the bed either as free particles or deposited on the steel wool particles is recovered by smelting.

In forming a device such as a cartridge for recovery of silver metal from solution, the bed is packed in the flow chamber of the cartridge to provide a packing in the cartridge which is permeable to the solution containing the silver ions. The compressible bed is compressed in the flow chamber to provide a packing with a level of permeability to permit flow of the solution through the packing while providing a retention time of the solution in the packing to allow efficient reduction of silver ions in the solution to silver metal.

If the degree of compression of the bed is too great the resultant packed mass will not have sufficient permeability to liquid flow; if the mass is not compressed, or the compression is insufficient, there will be gaps in the mass so that the contact time is not sufficient to allow efficient reduction of silver ions and efficient recovery of silver will not be achieved.

The bed suitably comprises 10 to 100%, preferably 93 to 97%, by weight, of the catalyst particles and 0 to 90%, preferably 3 to 7%, by weight of the particulate substrate to a total of 100%, based on the weight of the bed.

In a preferred embodiment employing steel wool particles as the catalyst and recycled paper fibers as the inert substrate, the bed comprises 95%, by weight, of the steel wool and 5%, by weight, of the paper fibers; however, in terms of volume this corresponds to about 75%, by volume, of the steel wool and 25%, by volume, of the paper fibers.

The device or cartridge includes a housing having an inlet end and an outlet end.

The cartridge may have separate inlets at the inlet end for the silver rich solution and the spent developer solution, or the silver rich solution and spent developer solution may enter the housing at a single inlet. An outlet for a discharge effluent is formed at the outlet end, and the inlet end and outlet end are separated by a flow chamber.

Suitably the inlet and outlet ends are remotely spaced apart to define an elongate flow chamber for passage of the silver rich solution and the spent developer solution. The bed of the inert, particulate substrate, in which the catalyst particles are dispersed is packed in the flow chamber so that the solutions entering at the inlet end must flow through the bed, in contact with the catalyst particles, to reach the outlet.

As the silver rich solution and spent developer solution flow along the random flow paths defined in the bed, silver ions are reduced to silver metal by the developer reagent and the developer reagent is oxidized.

The amount of spent developer solution used to reduce the silver rich solution is flexible. In a preferred embodiment all the spent developer solution employed as the source of reducing agent is generated in the photoprocessing at the same site where the silver rich solution is generated by the photoprocessing.

By way of illustration, under normal operating conditions, the active developer reagent contained in 1 litre of spent black and while developer solution should be sufficient to reduce all the silver contained in 1 litre of spent black and white fixer (silver rich solution). As an example, assuming that one litre of spent developer solution contains 1% of hydroquinone, by weight. This 1% hydroquinone is 0.09 moles and is capable of reducing 0.18 moles of silver ions which corresponds to 19 grams of silver. The average spent black and white fixer contains 2–10 grams of silver per litre. During normal operation the volume of spent developer solution and that of spent fixer are similar. Thus, one litre of spent developer solution should be more than sufficient to recover the silver contained in one litre of spent fixer solution.

Thus the silver rich solution and the spent developer solution are conveniently employed in a volume ratio of 1:1, however, it is within the skill of persons in the art to readily determine appropriate proportions of the two solutions to optimize the reducing reaction for the greatest efficiency by maximizing reduction of silver ions to silver metal, but minimizing discharge of unused organic reducing agent.

Conveniently the flow chamber of a cartridge may have a volume of 4,000 to 16,000 ml and employ a flow rate of the solutions of 25 to 10,000 ml/min, preferably 500 to 3,000 ml/min. Conveniently the flow chamber may have a length-:diameter ratio of 2:1 to 10:1. The cartridges are suitably disposed vertically and the solutions are pumped upwardly through the flow chamber, or may flow downwardly under gravity.

While the use of a cartridge containing a bed containing a catalyst, as described hereinbefore, represents a preferred embodiment, the process can also be carried out in other devices, for example, in a tank, suitably under agitation to ensure contact between the silver ions, organic reducing agent and the catalyst, when employed; with or without heating; or by heating the solutions in the tank in the absence of catalyst; or subjecting the solutions to ultrasonic radiation or ultraviolet radiation in the absence of a catalyst. In this case the precipitated silver metal in the form of silver particles, or deposited on the catalyst, when the catalyst is employed, is recovered by settling in the tank, or mechanical filtration, centrifugation or other conventional separation techniques.

A coagulating agent may be added to the solution to foster formation of larger silver particles and thereby facilitate the separation of silver particles.

BRIEF DESCRIPTION OF DRAWINGS

FIG. 1 is a schematic representation of the process of the invention carried out in a cartridge, in a preferred embodiment; and FIG. 2 is a detail of the bed in FIG. 1.

DESCRIPTION OF PREFERRED
EMBODIMENTS WITH REFERENCE TO THE
DRAWINGS

With further reference to FIG. 1, a cartridge 10 comprises a plastic housing 12 having an inlet 14 and an outlet 16 with a flow chamber 18 therebetween.

Flow chamber 18 is packed with a bed 20 which is partially compressed.

Bed 20 comprises fibrous cellulosic paper fibers 22 co-mingled with strands 24 of steel wool; the strands 24 and the paper fibres 22 interlock and the strands 24 are dispersed throughout the fibers 22.

Random flow paths for flow of liquid are identified by arrows 26.

A smelt furnace 28 has a gas outlet 30 and a molten silver outlet 32.

Detail A in FIG. 1 is shown in FIG. 2.

A liquid comprising a silver rich solution and spent developer solution is fed under pressure through inlet 14 into flow chamber 18 where it encounters bed 20 which is permeable to liquid. The liquid flows along the flow paths identified by arrows 26 through bed 20 where it contacts the steel strands 24 which catalyze the reduction of silver ions to silver metal, by the developer reagent in the liquid, with oxidation of the developer reagent to an oxidation by-product, which oxidation by-product travels with the liquid as it continues its flow towards outlet 16.

The precipitated silver particles are trapped between the fibers 22 which inhibit carriage of the silver by the solution flowing along the flow paths, and precipitated silver is also deposited on the strands 24.

The flow paths may be considered as a multitude of separate flow paths which repeatedly join and separate, branching out throughout the bed 22 so that the liquid follows a tortuous path through the bed 22. The tortuous path also serves to inhibit carriage of the recovered silver by the flowing liquid.

In the case where the fibers 22 are replaced by particulate sponge the open cells of the surface of the sponge particles, serve to trap recovered silver which then provides anchor sites for further recovered silver.

A solution which is substantially depleted in silver ions but which bears oxidation by-products of the reduction is discharged from outlet 16 of cartridge 10. This discharge solution has a content of iron ions significantly lower than when the steel wool is employed as a metal exchange mass, in the absence of the organic reducing agent.

When the cartridge 10 is spent by the deposit of silver on the strands 24, the flow of liquid is discontinued. At this stage cartridge 10 has a high charge or load of silver metal held in the mass of fibers 22 and deposited on strands 24. The mass of fibers 22 maintains its integrity throughout the process and does not collapse leaving voids or channels through which silver solution may escape contact with the strands 24.

The spent silver loaded cartridge 10 is delivered to smelt furnace 28 where the high temperature thermally destroys the plastic housing 12 and the fibers 22 to form gases which exit at outlet 30. Molten silver accumulates in furnace 28 with a slag and may be removed at outlet 32. The steel strands 24 in spent cartridge 10 form a top layer of molten steel in furnace 28, if the temperature is sufficiently high, floating on the molten silver, or the strands 24 remain solid and float on top of the molten silver in the furnace.

Alternatively the plastic housing may be cut out to release a core comprising the fibers 22, strands 24 and silver and this core is delivered to smelt furnace 28.

The invention is further illustrated by the following Examples:

EXAMPLE 1

The overflow from a fixer tank and that from a developer tank of a processor used for medical X-ray films at a radiology clinic was mixed and pumped through a CRC column containing steel wool. The input solution had a silver ion concentration of 4000 ppm and a pH of 7.3. the output from the CRC had a silver ion concentration of 1 ppm, an iron concentration of 200 ppm and a pH of 7.4.

In theory, one gram of iron could recover 3.87 grams of silver at the maximum, by metal exchange. In the above case, if all the input silver (4000 ppm, or 4.0 gram/litre) were recovered by iron, the effluent iron concentration should be more than 1000 ppm. In fact, the iron concentration is only 200 ppm, indicating that 80% of the silver is recovered by reduction by the developer reagent.

The iron in the CRC acts as a catalyst. The catalyst speeds up the reducing reaction rate between the silver and the developer reagent.

In the absence of the catalyst, the reducing reaction between the silver ions and the active ingredients is very slow at room temperature. If the overflow from the fixer tank and that from the developer tank is mixed and kept at room temperature, the silver ion concentration remains 4000 ppm at pH 7.3 after 100 hours. Merely mixing the spent fixer and the spent developer is not practical for recovering silver on a large scale, at room temperature and at a pH around 7.

EXAMPLE 2

A spent black and white fixer was mixed with a spent black and white developer at a volume ratio of 1:1. The final solution had a pH of 8.9 and contained 900 ppm of silver. ions. The solution was heated to and maintained at 65° C. for 90 minutes, with a minimum contact with air. The silver ion concentration did not change much. The pH of the solution was adjusted to 9.6 and heated to and maintained at 65° C. again for 2 hours before being allowed to stand for 48 hours. A solution containing 170 ppm of silver ions was formed above a precipitate containing silver metal. Thus more than 80% of the silver has been precipitated. Thus, a higher temperature and a higher pH improved the silver recovery process.

EXAMPLE 3

A mixture of a bleach fix and a stabilizer with a pH of 7.2 were brought into contact with a spent black and white developer with a pH of 10.2. The mixed solution had a silver ion concentration of 1250 ppm and a pH of 9.0. Heating the mixture at 65° C. for 90 minutes reduced the silver ion concentration to 50 ppm. The solution was allowed to stand overnight. The silver ion concentration in the solution on top of a layer of precipitate was further decreased to 4 ppm.

Separation of the liquid phase from the precipitate is suitably carried out not too long after. Oxygen in the air may oxidize the reduced bleach-fix which in turn oxidizes silver metal back to silver ions and thus increases the silver ion concentration in the solution.

EXAMPLE 4

A black and white fixer contained 19,000 ppm of silver ions. The pH of the fixer was adjusted to 7.3 with sodium hydroxide. A proper amount of glycol and iron were added to the fixer in a container and the container was vibrated for 1 minute. After being allowed to stand for 30 minutes, the final solution contained 400 ppm of silver ions and 830 ppm of iron ions.

If all the silver were recovered by metal exchange with iron, the final solution would contain 4800 ppm of iron (assuming 1 gram of iron recovers 3.87 grams of silver). Since the iron concentration is only 830 ppm, it can be seen that 80% of the silver is recovered by the reducing action of glycol.

The above Examples show that silver can be recovered from photographic silver rich solutions with spent photographic developers or other organic reducing agents.

Unless otherwise indicated amount in %, herein, are % by weight.

The invention has been described in detail with particular reference to preferred embodiments thereof, but it will be understood that variations and modifications can be affected with the spirit and scope of the invention.

What is claimed is:

1. A process for recovering silver from an ionic silver bearing spent photographic effluent comprising:

reducing silver ions in said effluent to silver metal with an organic reducing agent in the presence of a catalyst for the reducing.

2. A process according to claim 1, wherein said reducing agent is a photographic developer reagent.

3. A process according to claim 2, wherein said photographic developer reagent is present in a spent photographic developer solution.

4. A process according to claim 3, carried out at a pH of 6 to 14 and a temperature of 15 to 100° C.

5. A process according to claim 1, wherein said ionic silver bearing spent photographic effluent and said spent photographic developer solution flow in contact through a bed containing said catalyst in a particulate form effective to maximize the surface area of the catalyst available for catalysing the reduction of silver ions to silver metal.

6. A process according to claim 1, wherein said catalyst is selected from the group consisting of iron, copper, zinc, nickel, platinum and palladium.

7. A process according to claim 1, wherein said organic reducing agent is selected from the group consisting of pyrogallol, hydroquinone, catechol, p-phenylene diamine, p-aminophenol, methyl-p-aminophenol sulfate, amidol pyramidol, and 4-(N-ethyl-N-2-methanesulfonylaminoethyl)-2-methylphenylenediamine sesquisulfate monohydrate.

8. A process according to claim 1, wherein said organic reducing agent is selected from the group consisting of sugars, glycol, glycerin, alcohols and substituted benzenes in which the substituent is one or more of OH, Br, I, $NR_2$ and SR, in which R is H or lower alkyl of 1 to 6 carbon atoms.

9. A process for recovering silver from an ionic silver bearing spent photographic effluent comprising:

reducing silver ions in said effluent to silver metal with an organic reducing agent comprising photographic developer reagent present in a spent photographic developer solution, said reducing being carried out in the presence of a catalyst for the reducing;

wherein said ionic silver bearing spent photographic effluent and said spent photographic developer solution flow in contact through a bed containing said catalyst in a particulate form effective to maximize the surface area of the catalyst available for catalysing the reduction of silver ions to silver metal, and wherein said bed comprises a mass which comprises a particulate inert substrate co-mingled with particles of the catalyst so as to minimize contact between adjacent particles of the catalyst.

10. A process according to claim 9, wherein said catalyst comprises elongate particles of chopped steel wool.

11. A process according to claim 10, wherein said chopped steel wool particles have an average diameter of 0.03 to 0.2 mm and an average length of 1 to 7 mm, and said chopped steel wool particles interlock with said particulate inert substrate, said substrate being selected from cellulosic fibers, synthetic fibers or particles of sponge material.

12. A process according to claim 10, carried out at a pH of 6 to 14 and a temperature of 15 to 65° C.

13. A process for recovering silver from an ionic silver bearing spent photographic effluent comprising:

reducing silver ions in said effluent to silver metal with an organic reducing agent comprising a photographic developer reagent present in a spent photographic developer solution, in the presence of a catalyst for the reducing, wherein said catalyst is selected from the group consisting of aluminum oxide and zeolite.

14. A process for recovering silver from an ionic silver bearing spent photographic solution comprising:

flowing an ionic silver bearing spent photographic solution containing at least 10 ppm of silver ions together with a spent photographic developer solution containing photographic developer reagent, through a liquid permeable bed having disposed therein a catalyst for the reduction by said reagent, of silver ions in said solution to silver metal, establishing a pH of 7 to 9 in said bed, reducing silver ions to silver metal in said bed, with said photographic developer reagent, removing from said bed a liquid discharge derived from said solutions containing less than 5 ppm of silver ions and containing a non-phenolic oxidation by-product of said photographic developer reagent.

15. A process for recovering silver from an ionic silver bearing spent photographic solution comprising:

flowing an ionic silver bearing spent photographic solution containing at least 10 ppm of silver ions together with a spent photographic developer solution containing photographic developer reagent, through a liquid permeable bed having disposed therein a catalyst for the reduction by said reagent, of silver ions in said solution to silver metal, establishing a pH of 7 to 9 in said bed, reducing silver ions to silver metal in said bed, with said photographic developer reagent, removing from said bed a liquid discharge derived from said solutions containing less than 5 ppm of silver ions and containing a non-phenolic oxidation by-product of said photographic developer reagent, wherein said bed comprises a mass of a particulate inert substrate co-mingled with particles of the catalyst.

16. A process according to claim 15, wherein the catalyst is iron.

17. A process according to claim 16, wherein the iron is in the form of chopped steel wool particles having an average diameter of 0.01 to 0.2 mm and an average length of 1 to 7 mm, and said chopped steel wool particles interlock with said particulate inert substrate, said substrate comprising cellulosic fibers.

18. A process according to claim 17, wherein said particles have an average diameter of 0.03 to 0.06 mm and an average length of 2 to 4 mm; and said bed comprises 93 to 97%, by weight, of said steel wool particles and 3 to 7%, by weight, of said particulate inert substrate, to a total of 100%, based on the weight of the bed.

19. A process according to claim 18, wherein said substrate is selected from cellulosic fibers, synthetic fibers or particles of sponge material.

* * * * *